Nov. 19, 1935.  W. A. KUENZLI ET AL  2,021,452
FILTER
Filed April 23, 1932
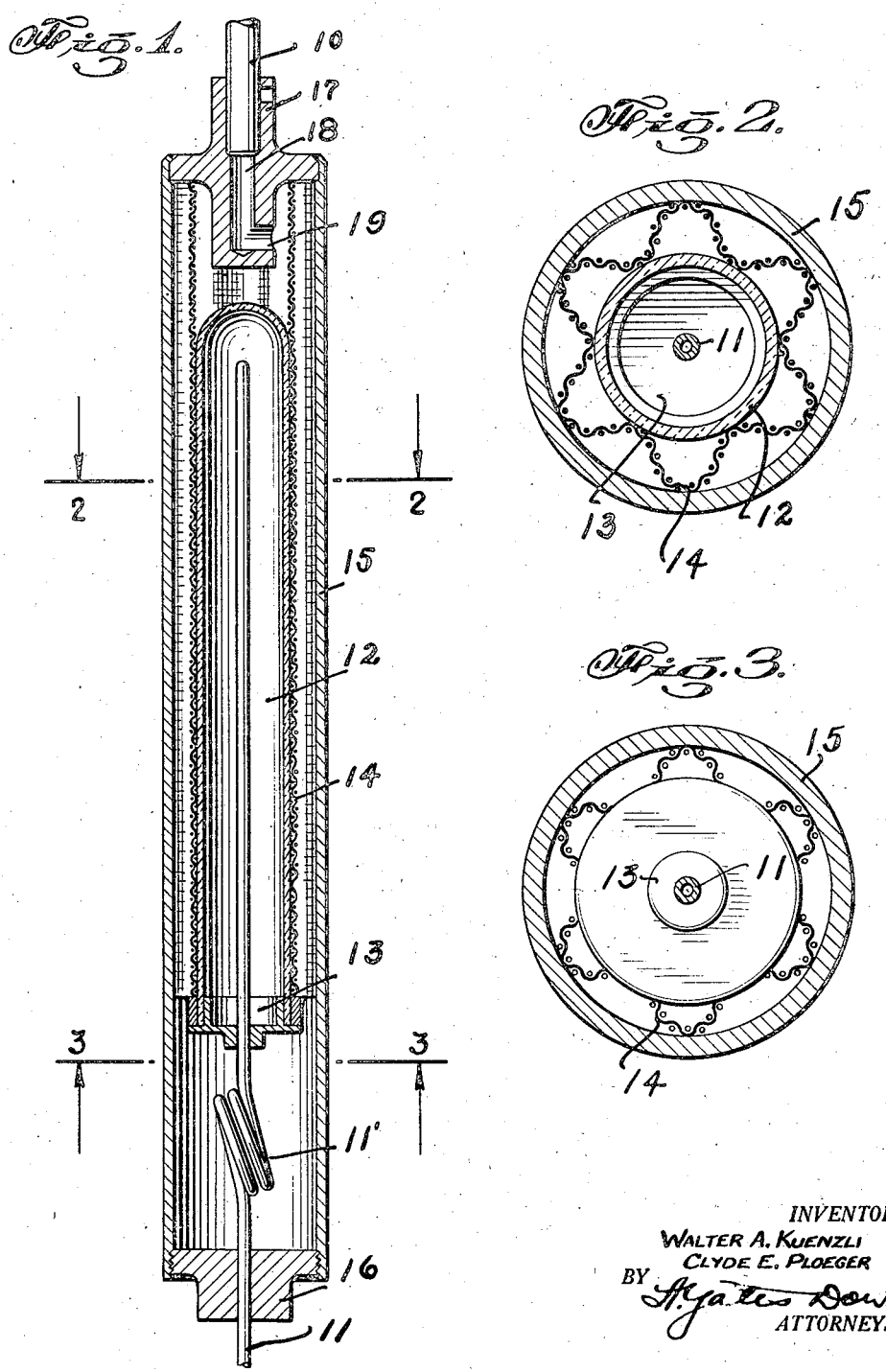
INVENTORS
WALTER A. KUENZLI
CLYDE E. PLOEGER
BY
ATTORNEYS.

Patented Nov. 19, 1935

2,021,452

UNITED STATES PATENT OFFICE 2,021,452

FILTER

Walter A. Kuenzli and Clyde E. Ploeger, Evansville, Ind., assignors to Servel, Inc., New York, N. Y., a corporation of Delaware Application April 23, 1932, Serial No. 607,050

8 Claims. (Cl. 210—112)

This invention relates to filters for removing foreign matter such as for example fine particles or the like from the liquid line of domestic refrigerators.

It is an object of the invention to provide a filter wherein the filtering element is supported in a manner to prevent its being injured by shocks that would ordinarily fracture the structure, and which is of the desired porosity and permeability to satisfactorily perform the filtering operation.

Other objects and advantages will be apparent from the following description taken in connection with the accompanying drawing, wherein Fig. 1 is a longitudinal section of a filter illustrating one application of the invention;

Fig. 2 a section on the line 2—2 of Fig. 1, and

Fig. 3 a section on the line 3—3 of Fig. 1.

Referring to the drawing, refrigerant is supplied from a condenser not shown, through a pipe 10 and capillary tube 11 to a cooling unit also not shown, and a filter constituting the present invention is utilized for removing fine particles or foreign matter from the liquid supplied through the pipe 10 so that it will not clog the capillary tube. The filtering element per se comprises a porous cup or cylinder 12 of a form similar to a conventional test tube used in chemical laboratories and being closed at one end and open at the other. This porous cup 12 is formed of refractory material and of a controllable porosity and permeability, and which is not susceptible to injury by the liquid refrigerant which is filtered.

One grave problem accompanying the use of a fragile filter cup of this character is the mounting or supporting of the same in a manner such as it will not be damaged by ordinary shocks or jars, and in accordance with the present invention the difficulty is overcome by the specific manner in which the parts are assembled.

The capillary tube 11 is provided with a coil 11' to increase its flexibility, and the filter cup 12 is mounted on the capillary tube by having its open end connected directly by means of a thin brass shell 13 with the capillary tube, the said tube extending through the cap and into the filter. The connecting shell 13 is formed with a disclike body having a central thickened hub which directly engages the capillary tube and a collar or sleeve which extends for a short distance into the end of the filter cup. A band of solder embraces the extremity of the filter cup and intimately secures the cup to the body of the shell 13. A screen in the form of a resilient shock-absorbing sleeve of reticulated wire is placed around the filter cup and forms a shock-absorbing medium between the filter cup and an imperforate shell or housing 15 which forms the outer casing of the filter. The shock-absorbing sleeve 14 is corrugated as shown in Figs. 2 and 3 and engages both the filter cup and the outer shell permitting the filter cup to move resiliently when the device receives a sudden jar or shock.

The steel shell or housing 15 is provided at one end with a threaded plug or closure head 16, which snugly receives the capillary tube 11, and at its opposite end with another plug or closure head 17, provided with a longitudinal bore or passage 18, in which terminates the pipe 10 which extends from the condenser. The inner end of the closure plug 17 terminates in spaced relation to the closed end of the filter cup 12, and in order to prevent inflowing liquid refrigerant from impinging directly on the cup, the plug is provided with a lateral bore or deflecting passage 19, which communicates with the bore 18 of the plug.

With this construction the pipe 10 through which liquid refrigerant is supplied from the condenser and the capillary or small tube 11 through which the refrigerant is conducted to the cooling unit are connected by an imperforate shell or housing in which a porous filter member is flexibly or yieldably supported, such yieldable support being the natural resiliency of the capillary tube 11 enhanced by the coil 11' and the fluted screen 14 located between the cylindrical filter cup and its imperforate metal housing, the screen being of a length to engage the end of the housing and absorb with the capillary tube any end thrust upon the filter cup. The cup is thus maintained in a sufficiently shockproof mounting to prevent its being damaged even if the filter assembly is dropped on a hard surface from a considerable height.

It will be apparent to those skilled in the art that various other changes may be made in the construction and arrangement without departing from the spirit of the invention, and therefore the invention is not limited to that which is described in the specification and shown in the drawing, but only as indicated in the appended claims.

What is claimed is:

1. A filter comprising an elongated housing, a closure for each end of the housing, a tube extending through one of said closures and provided with a coil adjacent said last mentioned closure; a disc on said tube on the opposite side of the coil from the adjacent end of the housing and having a concentric collar, a refractory filter member closed at one end and having its other end fitting over the collar of the disc, a band of solder securing said filter member and disc together, the closure for the end of the housing opposite the tube terminating adjacent the closed end of the filter member and provided with a lateral discharge for preventing direct impingement of liquid upon the filter member, and a longitudinally corrugated reticulated sleeve between the filter member and the housing and snugly engaging each, and also engaging the closure member at one end of the housing.

2. A filter comprising an elongated housing, a closure for each end of the housing, a tube extending through one of said closures and provided with a coil adjacent said last mentioned closure, a refractory filter member mounted in said housing, the closure for the end of the housing opposite the tube terminating adjacent the closed end of the filter member and provided with a lateral discharge for preventing direct impingement of liquid upon the filter member, and a longitudinally corrugated reticulated sleeve between the filter member and the housing and snugly engaging each, and also engaging the closure member at one end of the housing.

3. A filter comprising an elongated housing, a closure for each end of the housing, a tube extending into said housing through one of said closures, a refractory filter member mounted in said housing and having one end closed, the closure for the end of the housing opposite the tube terminating adjacent the closed end of the filter member and provided with a lateral discharge for preventing direct impingement of liquid upon the filter member, and a perforated shock-absorbing sleeve between the filter member and the housing.

4. A filter comprising an elongated housing, a closure for each end of the housing, a tube extending into said housing through one of said closures, a refractory filter member mounted in said housing, and a perforated shock-absorbing sleeve between the filter member and the housing.

5. A filter comprising a housing provided with an inlet at one end, a tube projecting through the other end of the housing, a fragile filter member of refractory material open at one end, a metallic closure for the open end of the filter member mounted on said tube, and a corrugated screen between the filter member and the casing resiliently supporting the filter member said tube being provided with a coil between the end of the housing and the filter member.

6. A filter comprising a housing provided with an inlet at one end, a tube projecting through the other end of the housing, a fragile filter member of refractory material open at one end, a metallic closure for the open end of the filter member mounted on said tube, and a corrugated screen between the filter member and the casing resiliently supporting the filter member.

7. A housing, a fragile filter member in said housing, a resilient conduit connected to said filter member and extending through and fixed to said housing, a screen associated with said filter member in said housing and assisting in resiliently supporting the same.

8. A filter for use in a refrigerating system constructed to withstand deterioration occasioned by the passage of refrigerant therethrough comprising a housing, a relatively long flexible metallic tube projecting through one end of the housing, a hollow fragile, refractory filtering member mounted on said tube and resiliently supported thereby, and cushioning means in said housing substantially enveloping said hollow filtering element and supporting said filtering element in a manner to minimize the transmission of shock thereto.

CLYDE E. PLOEGER.
WALTER A. KUENZLI.